March 23, 1943.　　　　R. SCHILLING　　　　2,314,559
HEADLIGHT TESTER
Filed Jan. 10, 1941　　　3 Sheets-Sheet 1
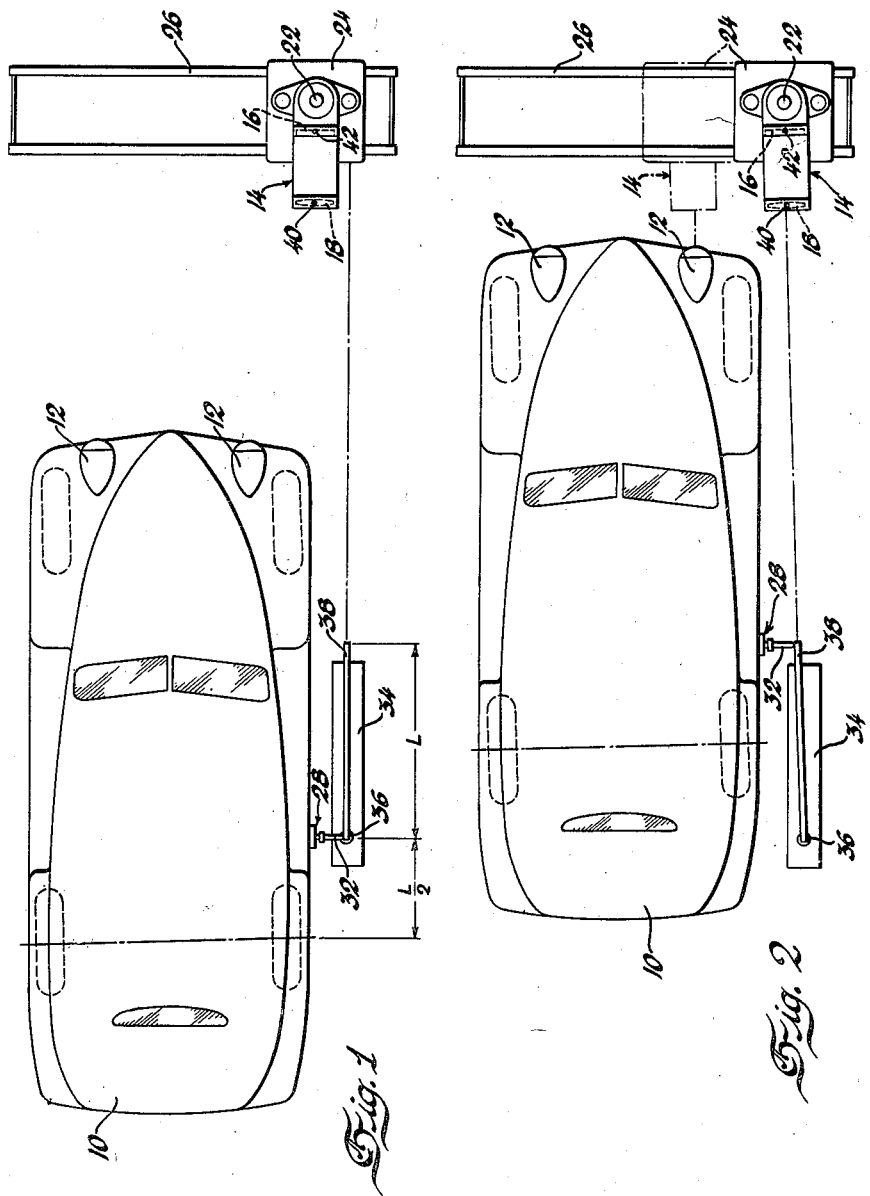

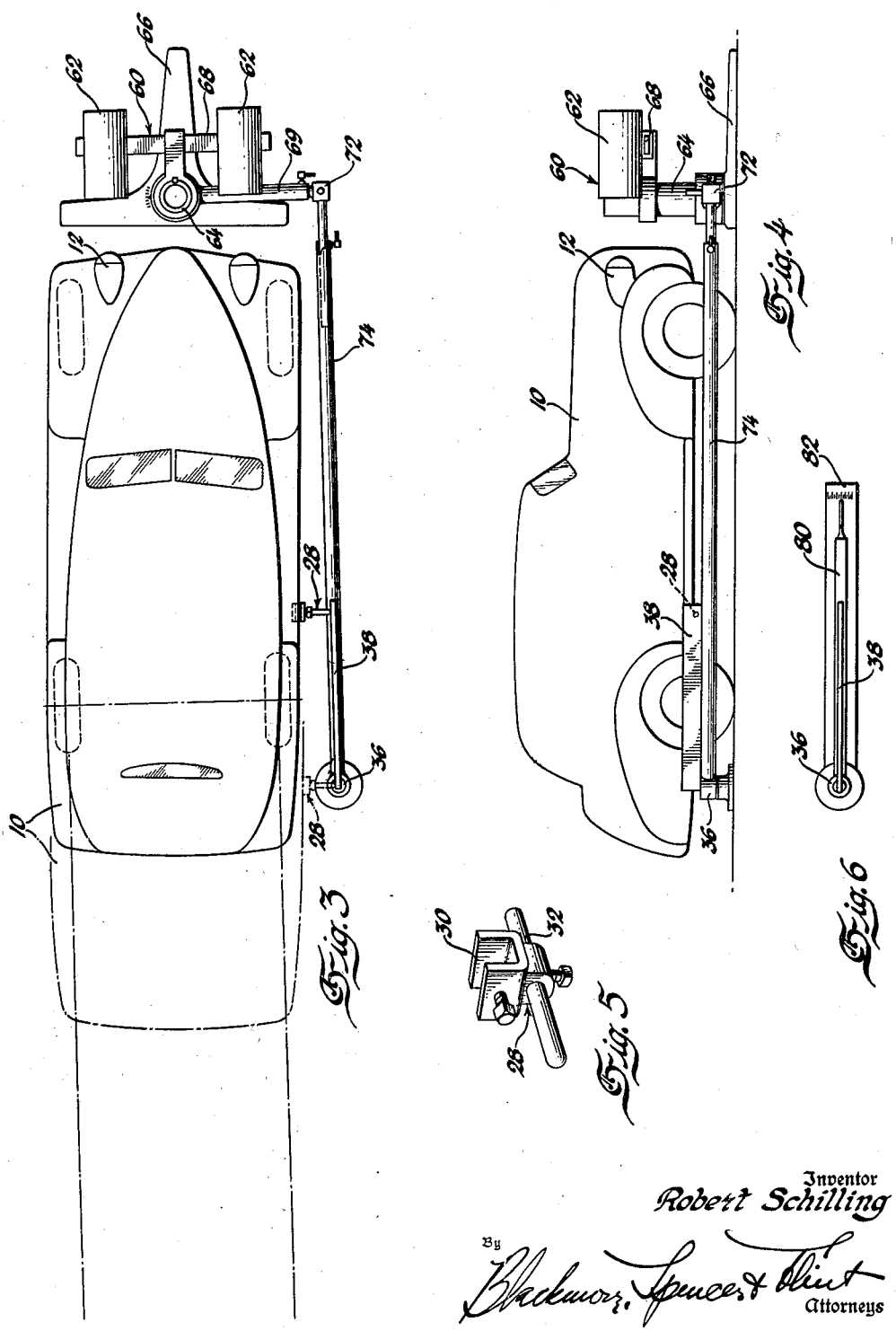

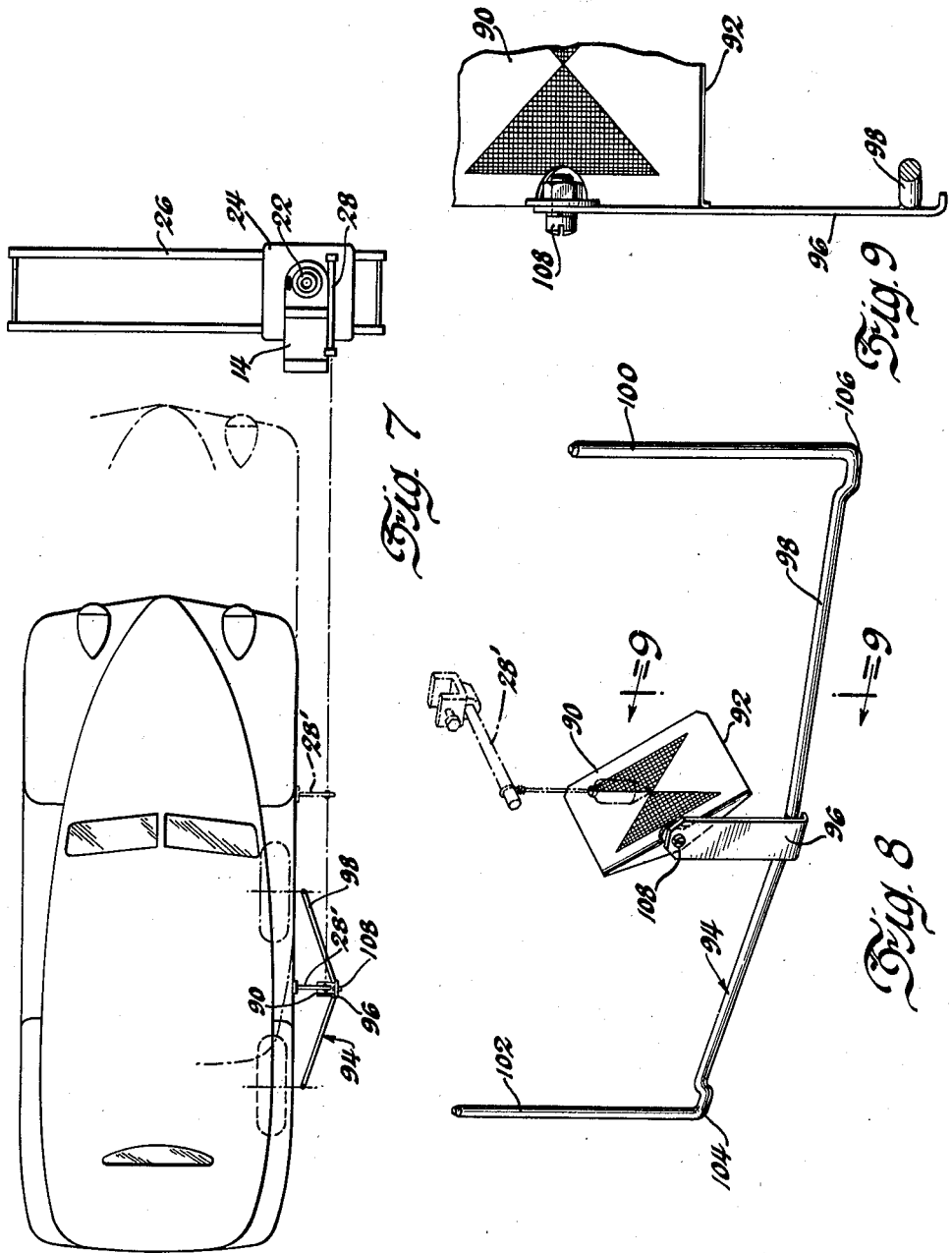

Patented Mar. 23, 1943

2,314,559

UNITED STATES PATENT OFFICE 2,314,559

HEADLIGHT TESTER

Robert Schilling, Detroit, Mich., assignor to General Motors Corporation, Detroit, Mich., a corporation of Delaware Application January 10, 1941, Serial No. 373,917

2 Claims. (Cl. 33—180)

This invention has to do with methods and apparatus for testing headlamps on automobiles to insure that they are correctly aimed. It is essential that modern headlamps be aimed properly not only with respect to height of beam but also laterally. This is especially important in the case of "sealed beam" headlamps for the passing beam is normally aimed but slightly lower than the driving beam and shifting of the beam to the right is relied upon to a large extent to get it out of the line of vision of the approaching driver. Should the headlamps be aimed too much to the left they will cause glare and as modern headlamps have higher candlepower than the older lamps the glare may be dangerous as well as annoying.

In the lateral aiming of headlamps it has heretofore been the custom to employ as a reference axis some line fixed by the car body, usually the longitudinal center line connecting the radiator cap with the center of the rear window. I have found, after testing many cars that the use of such reference lines introduces substantial error in laterally aiming the headlamps for frequently the body is not correctly centered on the chassis or the chassis is not mounted at precisely right angles to the driving axle or one or both axles are displaced laterally of the chassis and consequently the reference line employed does not represent the straight ahead direction of travel of the car.

I have succeeded in establishing by a very simple method a correct reference axis for lateral aim of the headlamps. This method is based on the fact that the direction of travel of the car as a whole is set by the direction in which the rear axle travels. In other words, the direction of travel is at right angles to the rear axle. Since the rear axle is ordinarily so completely housed that no surfaces are available for use to establish a perpendicular by mechanical devices, I have devised the means now to be described based on movement of the car. There is first marked, by means of a suitable marker or target on the floor or roadway, the location in space of a selected reference point on the car and then the car is moved forwardly. The marker and the final position of the reference point determine the true line of travel of the car provided the car was moved in a straight line. However in most cases when the car is moved forwardly it does not follow a perfectly straight path but one that is slightly curved. To insure accuracy in determining the direction of travel whether the path of travel be straight or curved I have devised the method now to be described; the reference point previously referred to is established on the car as by securing a marker or plumb bob on it ahead of the rear axle a distance equal to approximately one-half the distance the car is to be moved forwardly during the test. The position of the plumb bob is marked on the floor preferably by means of a portable target positioned beneath the bob. The car is then moved forwardly the prescribed distance thereby bringing the rear axle, which is coincident with the radius of turn, to a position bisecting the arc of travel of the plumb bob as well as the corresponding chord defined by the target and plumb bob. Since the bisector of the arc of a circle is perpendicular to the corresponding chord, the line joining the target and plumb bob is perpendicular to the rear axle and correctly indicates the direction of travel of the car. This line is used as the reference axis.

With the reference line now established the headlight tester is lined up with its optical axis in the vertical plane containing the reference line and is then moved into position in front of one of the headlamps, care being taken to make sure that the optical axis of the tester is not moved out of parallel with the reference plane in moving it into working position. A good way to insure maintaining this parallelism is to mount the tester on a track extending transversely of the car as disclosed in Patent No. 2,176,215 issued to R. N. Falge on October 17, 1939.

With the tester properly positioned in front of the lamp the headlamp may be accurately aimed in the usual manner by adjusting it until its beam is properly centered on the screen or photocells provided as a guide in aiming.

According to another embodiment of my invention the headlight tester may be mounted on a vertical pivot and may be provided with a rigid right angled bracket after the manner of a carpenter's square, the long arm of which is positioned parallel to or coincident with the reference axis established as described. Thus the correct position of the tester is assured.

In the drawings:

Figure 1 is a diagrammatic plan view showing one position of the automobile and testing apparatus employing my method.

Figure 2 shows a similar view showing the second position of the parts.

Figure 3 is a view similar to Figure 1 showing a modified construction, one of the two positions of the car being suggested by dotted lines.

Figure 4 is a side view of the construction of Figure 3.

Figure 5 is a perspective view showing a marker in the form of a convenient bracket for attachment to the running board.

Figure 6 shows a modification of Figure 3 providing for calibration of the lateral angle indicator.

Figure 7 is a top plan view showing a further modification.

Figure 8 is a perspective view of the marker or target and its support.

Figure 9 is a fragmentary view taken approximately on line 9—9 of Figure 8.

10 indicates a conventional automobile provided with headlamps 12. In Figures 1 and 2, 14 indicates diagrammatically a headlight tester preferably of the construction shown in said Falge patent 2,176,215 consisting of a test head comprising a screen 16 and a lens 18 for concentrating the beam pattern on the screen, the lens and screen constituting a test head mounted for pivotal adjustment about vertical pivot 22 on stand 24 which is mounted to travel on tracks 26 extending transversely of the car. 28 indicates a bracket which may be of the construction shown in Figure 5 consisting of U-clamp 30 adapted to be secured to the running board or other suitable part of the car body and carrying adjustable rod 32. The projecting end of the rod 32 provides the reference point on the car previously referred to and the bracket 28 is secured to the car in such position that the end of the rod is a distance $$\frac{L}{2}$$

ahead of the rear axle, where L is the distance the car is moved ahead during the test. 34 indicates a marker consisting of vertical pivot 36 from which extends a rigid rectilinear arm or vane 38, the length of which is equal to the distance L.

In the operation of the invention the marker 34 is moved to the position shown in Figure 1 in which the pivot 36 marks the position of the end of rod 32 or a point in vertical alignment with the end of the rod. Next the automobile is moved forward the distance L to the position shown in Figure 2 and the pivot arm or vane 38 is swung into engagement with the end of rod 32. Arm 38 now correctly indicates the direction of travel of the vehicle for the reasons previously explained. This done the headlight tester is moved along the track 26 and the test head is swung about pivot 22 until its optical axis is in alignment with arm 38. Sights of any suitable sort such as indicated at 40 and 42 may be provided on the test head to facilitate alignment. This accomplished, the test head is locked in position on its stand 24 and the tester is then moved on the track to the position shown in dotted lines in Figure 2 centered in front of one of the headlamps as shown. The headlamp may now be accurately aimed, the usual reference lines on screen 16 serving as a guide by indicating whether or not the beam is properly centered on the screen.

A slight error is introduced by the fact that the vehicle actually travels through an arc which is longer in degrees than the arc whose chord coincides with vane 38 and since bracket 28 has been located but the distance $$\frac{L}{2}$$

ahead of the rear axle, when the vehicle is moved ahead the rear axle in its final position will not exactly bisect the arc of travel of bracket 28. It has been found that the error introduced is small, i. e. less than one-one hundredth of a degree under ordinary conditions.

It will be found convenient to make the arm or vane 38 of the length L so that it serves as a measuring stick for the vehicle movement and also, if desired, for the positioning of the bracket 28 at the desired distance ahead of the rear axle.

In the modification shown in Figures 3 and 4 the headlight tester 60 is indicated diagrammatically as consisting of a pair of test heads 62 mounted on vertical pivot 64 secured on base 66. From the test head support 68 extends rigid arm 69 in which is slidably mounted one arm of a rigid right angled member 72, the other arm of which is slidably mounted in tubular member 74 which is connected to vertical pivot 36 from which arm or vane 38 extends.

It will be apparent that the mechanical connection provided by the parts 69, 72 and 74 insures that the axes of the test heads 62 will be parallel to the arm or vane 38. Sliding of the member 72 in tubular members 69 and 74 permits the parts to assume the required positions without binding. At the same time the required right-angled relation of the parts is maintained.

In Figure 6 there is indicated in addition to the arm or member 38 a pointer 80 cooperating with a fixed scale 82 calibrated to indicate the lateral angle. An objection to this arrangement is the fact that the pivot 36 would have to be likewise fixed and it may prove inconvenient to provide for moving the automobile up to the pivot with the required accuracy.

The modification shown in Figures 7, 8 and 9 has proven to be particularly convenient. In this case the bracket 28', of the same construction as bracket 28 in the preceding figures, is used to support plumb bob indicated at 90 in Figure 8. Associated with the plumb bob is a marker 92 carried by a portable stand 94 consisting of a central bracket or pedestal 96 to which is secured rod 98 having upturned ends 100 and 102, the lower ends of which are shaped to form supporting feet 104 and 106. The ends 100 and 102 are spaced the distance L through which the car is to be moved during the test. As best shown in Figure 8, target 92 is adjustably secured to pedestal 96 by bolt 108 so that it may be tilted to a convenient position for inspection as shown in that figure.

There is shown in Figure 7 the headlight tester 14 mounted on vertical pivot 22 carried by stand 24 slidable on track 26. The test head is provided with telescopic sight indicated at 28.

This form of the invention operates substantially the same as the form first described. The bracket 28' with its plumb bob suspended from it is secured to the car a distance $$\frac{L}{2}$$

ahead of the rear axle. The target and its support provides a convenient means for measuring this distance. It is set up with one upturned end 102 aligned with the rear axle and the rod 98 extending toward the test head as shown in Figure 7. Thereafter the bracket 28' may be secured in vertical alignment with the center of the target, thus insuring that it will be the proper distance ahead of the rear axle. After centering the plumb bob on the target the car is moved forward the distance L, causing the bracket 28' and the plumb bob to assume the position shown in dotted lines in Figure 7. Thereafter the test head 14 is turned and shifted until the plumb bob and the center of the target 92 appear in alignment when viewed through the telescopic sight 28 and the test head is then locked to the stand 24. The test head may then be moved along the tracks into alignment with the headlamps to complete the testing and aiming as previously described.

I claim:

1. The combination of a portable stand having a vertical pivot thereon adapted to be positioned in coincidence or vertical alignment with a selected point on the vehicle, a rigid rectilinear arm secured to said stand by means of said pivot so that it may be swung into engagement with said point when the vehicle is advanced, a headlamp tester comprising a stand, a vertical pivot thereon, a test head pivoted on said pivot and an arm rigidly secured to said test head and secured at right angles to said first-named arm, each of said arms being adjustable in length.

2. The method of establishing a reference axis for use in the lateral aiming of headlamps which consists in selecting a point on the vehicle displaced longitudinally from the rear axle of the vehicle by a distance equal to one-half the distance the vehicle is moved, as hereinafter set forth, placing a marker in position to mark the position of said point, and moving the vehicle longitudinally the said distance to a second position whereupon the marker and the second position of said point provide the desired reference axis.

ROBERT SCHILLING.